July 18, 1967 P. L. LOVE 3,331,204
STANDBY AFTERBURNER OPERATION SYSTEM
Filed Feb. 7, 1966 2 Sheets-Sheet 1
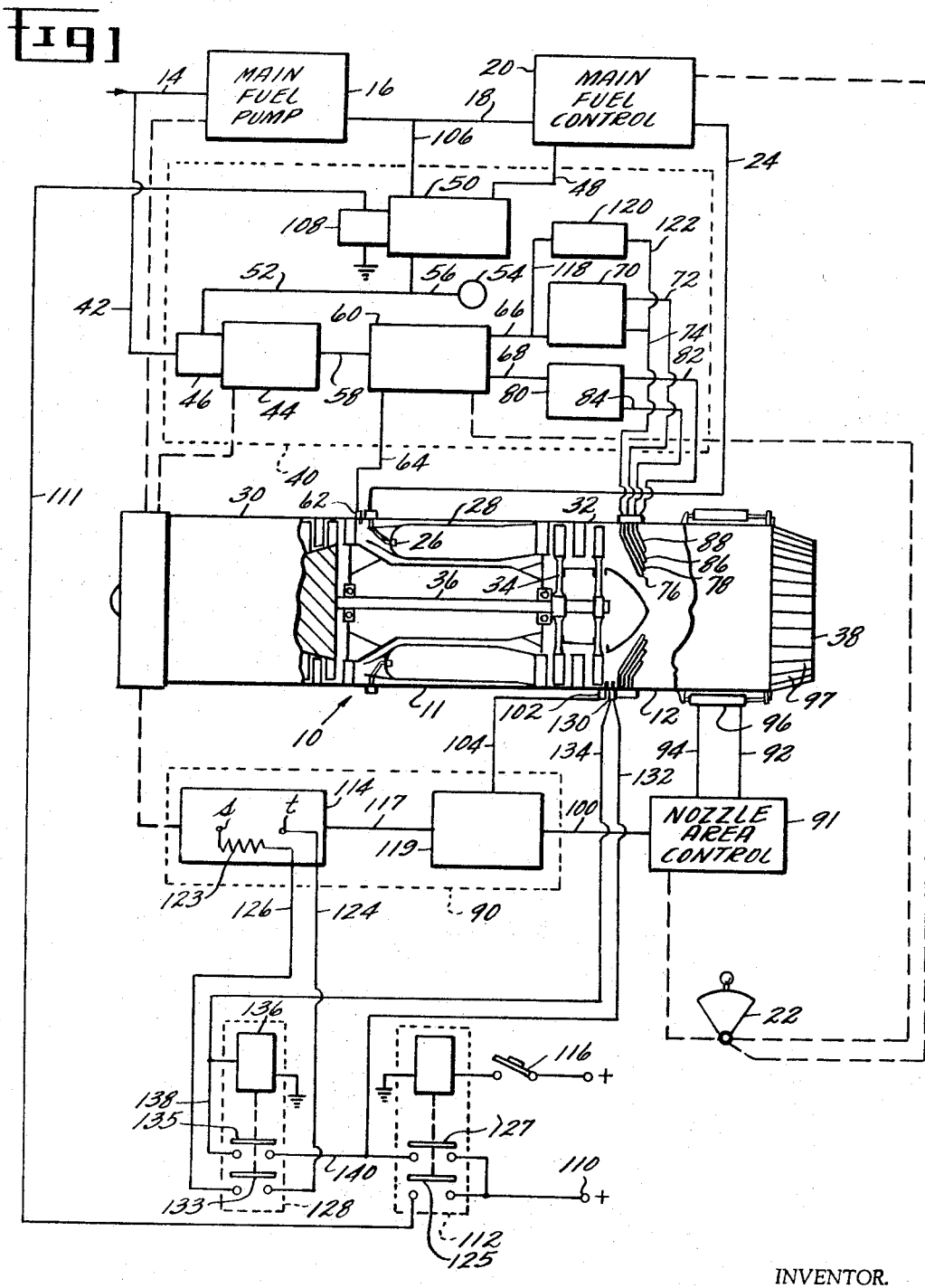
INVENTOR.
PENDER L. LOVE
BY
ATTORNEY

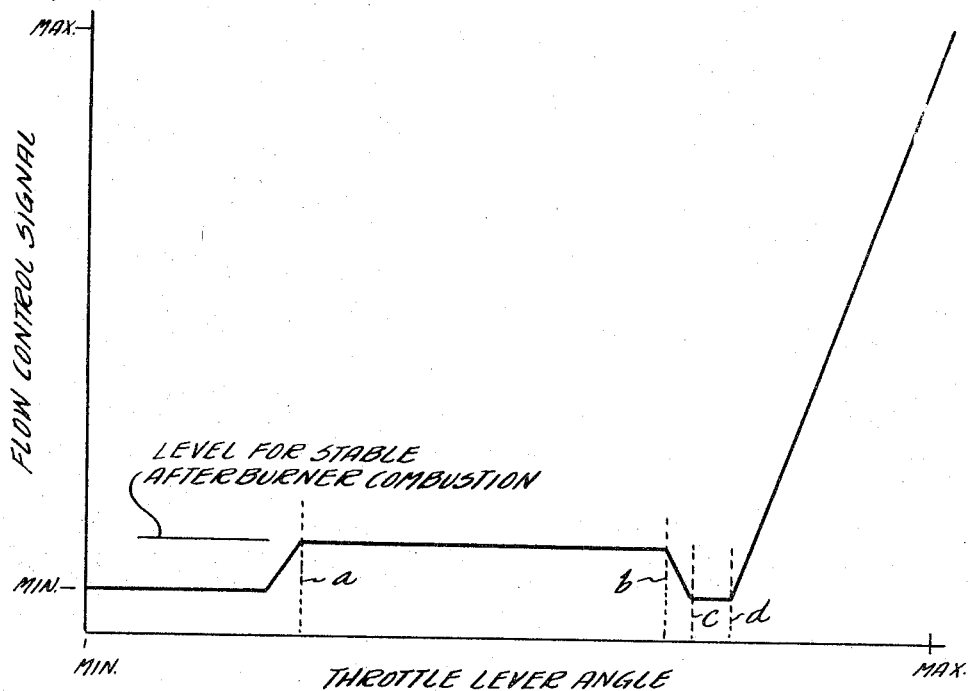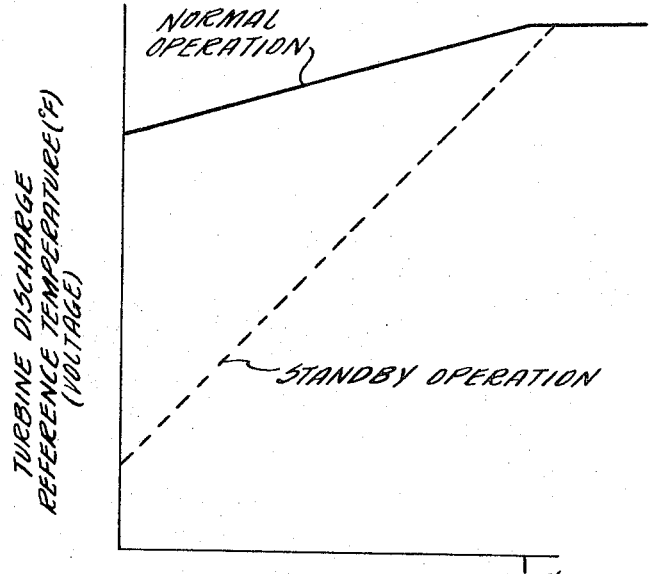

United States Patent Office 3,331,204
Patented July 18, 1967

3,331,204
STANDBY AFTERBURNER OPERATION SYSTEM
Pender L. Love, Milford, Ohio, assignor to General Electric Company, a corporation of New York
Filed Feb. 7, 1966, Ser. No. 525,639
8 Claims. (Cl. 60—238)

The present invention relates to fuel control systems for turbojet engines and more specifically to improvements in engine afterburner fuel controls.

It is common practice particularly in the case of high performance turbojet engines used in the propulsion of aircraft to utilize an afterburner for augmented thrust when flight conditions necessitate maximum power from the engine. The advantage of the afterburner is that it adds little weight or bulk to the engine. On the other hand, it is generally used only for short periods of time due to its high fuel consumption rate. Typical conditions where afterburners are used include take-off, military combat maneuvers, in-flight refueling and an emergency pull out from a landing approach path.

The latter situation requires an extremely rapid availability of full augmented power from the afterburner in the case where a high performance aircraft having a fast approach speed is landing on an aircraft carrier. Such an aircraft approaches the ship at speeds which are near the minimum at which the aircraft wings will provide lift. In an emergency pull out from the approach path a rapid availability of full power is required to not only avoid loss of lift but to regain maneuverability which is essentially lost in the final moments of a landing.

At present afterburner fuel control and distribution systems permit operation of an afterburner by scheduling fuel thereto only after several engine conditions have been reached, namely, advancement of the throttle to full open and a main combustor thrust output nearly that of maximum. A finite delay exists between the time the throttle is advanced at an extreme rate to full open and the time the afterburner is producing full augmented thrust due to the time required for a buildup of thrust from the main gas generator and the time for filling the afterburner fuel distribution system.

This delayed afterburner thrust response to a panic throttle lever movement to full open may seriously impair the landing performance and safety of an aircraft.

One object of the invention is to significantly reduce the transition time from low thrust operation to full power augmented thrust operation of a gas turbine engine.

Broadly speaking this end is attained by the provision of means for initiating standby operation of the afterburner during operation of the engine at low thrust levels to eliminate most, if not all, of the factors above discussed which delay the availability of full augmented thrust under emergency conditions. Further and in accordance with another object of the invention, means are provided for maintaining a substantially constant thrust level when afterburner operation is initiated at low thrust levels.

Further and in accordance with yet another object of the invention, means are provided for insuring the afterburner combustion will be maintained when shifting to fully augmented thrust operation from standby operation. These means are employed in a multimanifold afterburner system. Means are provided to bleed fuel into all manifolds since it is usual that only one manifold and the nozzles attached thereto would be in use during standby operation.

The above and other related objects and features of the invention will be apparent from a reading of the following description of the disclosure and the novelty thereof pointed out in the appended claims.

In the drawings:

FIGURE 1 is a block diagram showing a turbojet engine and those portions of its control system pertinent to the present invention;

FIGURE 2 is a schedule of fuel flow as a function of throttle angle in the scheduling of fuel to an afterburner of the turbojet engine shown in FIGURE 1;

FIGURE 3 is a schedule of temperature reference as a function of engine rotation used in the area control of the turbojet engine exhaust nozzle in FIGURE 1.

Reference is now had to FIGURE 1 which diagrammatically illustrates those portions of a control system for a turbojet engine 10 which are pertinent to the present invention. The engine 10 is used for propulsion of an aircraft (not shown) and is of the type that has a main combustor section 11 and an afterburner 12 to enable augmented thrust for increased performance.

The primary fuel system for this engine comprises a main supply conduit 14 which receives fuel from a fuel tank (not shown) for delivery to a main fuel pump 16 which is driven from the engine 10 through a mechanical coupling. The output of fuel pump 16 passes through conduit 18 to a main fuel control 20.

The main fuel control 20 may be any of several devices known in the art which schedules fuel at a rate primarily set as a function of the angle of a pilot controlled throttle lever 22 mechanically connected thereto. The scheduled rate of fuel flow is also a function of various engine operating parameters, again in accordance with teachings known in the art. The output of the main fuel control 20 is fed through a conduit 24 to a series of fuel nozzles 26 for atomization and injection into a combustor 28. The fuel is mixed with air that has been highly compressed by an axial flow compressor 30. The fuel-air mixture is ignited by means well known in the art and the combustion gases pass through a turbine section 32, having located therein a series of turbine wheels 34 that drive the compressor 30 through a shaft 36. The combustion gases are discharged from an exhaust nozzle 38 at a very high velocity which provides the primary propulsion of the aircraft.

Should flight situations require engine thrust levels above those attainable by the beforementioned propulsion system, the afterburner 12 may be actuated by conventional movement of the throttle lever 22 to an extreme position. When this is done and when engine rotation approaches a maximum value which is indicative of maximum main combustor section thrust output, fuel flows to the afterburner 12 through an afterburner fuel control system 40 now to be described.

A conduit 42, connected to the supply conduit 14 delivers fuel to an afterburner fuel pump 44, also driven from engine 10. An on-off valve 46 prevents fuel flow to the pump 44 until the aforementioned rotational level is reached. The valve 46 is actuated by a speed pressure signal derived from the main fuel control 20. This pressure signal is transmitted by way of conduit 48, valve 50 and conduit 52. This speed pressure signal is also employed to actuate an afterburner ignition switch 54 which is connected to conduit 52 by conduit 56.

Once the valve 46 is opened fuel flows through conduit 58 to an afterburner fuel scheduler 60 which is mechanically connected to the throttle lever 22 and controls fuel flow as a function of its angular position. The fuel scheduler 60 also controls fuel flow as a function of the air discharge pressure from compressor 30 as sensed by a sensor 62 which provides a pressure signal that is fed to scheduler 60 by a connection 64.

The general design and construction of the scheduler 60 may take various forms well known in the art and is herein exemplified as being of the type adapted for use with an afterburner combustor system having core fuel nozzles 76, 78 and annular fuel nozzles 86, 88. The scheduler 60 thus has two output conduits 66, 68. Conduit 66 connects with a valve 70 having a low pressure discharge conduit 72 extending to the fuel nozzles 78 and a high pressure discharge conduit 74 extending to the fuel nozzles 76. The output conduit 68 is similarly connected to a valve 80 having low and high pressure discharge conduits 82, 84 respectively connected to the fuel nozzles 88, 86.

The core and annular fuel nozzles 76, 78, and 86, 88, respectively inject fuel into the afterburner 12 where the fuel is ignited by well known means responsive to the afterburner ignition switch 54. The augmented combustion causes the combustion gases to leave the exhaust nozzle 38 at a much higher velocity than would be obtainable without afterburner operation. The increase in gas velocity provides augmented thrust which greatly increases the thrust of engine 10.

In turbojet engines it is also customary to provide means for varying the area of the discharge nozzle 38 to maximize the gas velocity therefrom and maintain stable operating conditions within safe temperature limits. A nozzle area control system for such purpose comprises a nozzle area control 91 which generates control signals for hydraulic connections 92, 94 to actuators 96. The actuators 96 pivot flaps 97 which define the discharge nozzle 38 and thus control its area.

The control signal generated by the control 91 is primarily a function of the position of the throttle lever 22 (note the mechanical connection thereto) and also a limited function of the discharge temperature of the turbine section 32. The latter parameter is fed to control 91 through a suitable connection 100 from a temperature control (generally indicated by reference character 90) which has an input thereto from a turbine discharge temperature sensor 102 through a suitable connection 104. The temperature signal thus generated is, in effect, an override causing the nozzle 38 to be opened should the sensed temperature exceed a predetermined reference temperature for a given engine rotational speed.

It is apparent from the foregoing discussion of what is essentially conventional systems that a finite delay exists between the time throttle lever 22 is advanced to its extreme position for maximum thrust and the time the afterburner 12 is producing full augmented thrust. This is particularly true where the engine is operating at a low thrust level. The delay, which may be as much as 5 seconds, is due to engine acceleration time, and time for the fuel to travel to the afterburner fuel nozzles 76, 78, 86, 88 after the on-off valve 46 has been opened.

To reduce the above delay, in accordance with the present invention, the afterburner fuel control system 40 is adapted to selectively schedule fuel flow at a relatively low rate to the afterburner 12 when a low rate of fuel is being scheduled to the combustor nozzles 26, under low engine thrust conditions that exist during an aircraft landing approach. The afterburner 12 is in a standby state of "readiness" to rapidly produce full augmented thrust in response to a panic throttle movement to full open where an aircraft requires maximum engine power to pull out of the approach path or meet other emergency conditions.

Although automatic means such as an altitude sensing device could be employed, it is primarily intended that the present system will be actuated by a pilot controlled switch 116. Closure of this switch energizes an electrical circuit (later described) which actuates a solenoid 108 to shift the valve 50 to another operative position, valve 50 being a three-way valve. The output pressure of the main fuel pump 16 is now directed through conduit 106 to the conduits 52 and 56. The main pump pressure is always as high as the speed signal pressure so that the afterburner fuel system is now actuated as before described. This is to say that valve 46 is opened for flow of fuel to the afterburner pump 44 and the ignition switch 54 is closed.

With on-off valve 46 open, fuel is discharged by the fuel pump 44 to the afterburner fuel scheduler 60, which has been modified to schedule flow during low throttle lever angles.

For convenience of understanding, the scheduling of fuel may be considered as a plot of throttle lever angle against a cam profile (cams are in fact used in many instances) representing fuel flow as depicted in FIGURE 2. The range of desired low thrust afterburner operation, as related to throttle lever angle, is indicated by lines $a$ and $b$ in FIGURE 2. Thus upon closure of switch 116, with the throttle lever angle between the limits of lines $a$ and $b$, the scheduler 60 will pass to the afterburner 12 a minimum amount of fuel to maintain effective combustion from at least certain of the nozzles in the afterburner.

While fuel is scheduled at a constant value as a function of throttle angle during low thrust operation of the afterburner, it will, of course, be appreciated that total fuel flow is modified in accordance with compressor discharge pressure (input from sensor 62) to also maintain a constant fuel-air ratio for efficient combustion. While not necessary in all instances, it is usually preferred that the augmented thrust be maintained at a minimum level, as described, when the afterburner is in this standby type of operation to minimize the increased thrust and conserve fuel.

It will be noticed that fuel flow as a function of throttle lever angle drops to a sharply reduced plateau (lines $c$ and $d$) level at a throttle lever angle beyond line $b$. This is done to facilitate operation of the afterburner fuel control system 40 in conventional fashion as previously described. It is contemplated that normal afterburner operation will be initiated when the throttle lever angle is between lines $c$ and $d$. Operation will therefore start at a low level and there will be no undesirable thrust transient due to a sudden, relatively large flow when the afterburner 12 is actuated in such normal fashion.

As was stated before, the fuel scheduler 60 has core and annulus outputs to the afterburner 12. The fuel scheduler 60 controls the ratio of these outputs in accordance with total scheduled flow, at low flow rates, all of the flow going to the core output. When the fuel scheduler 60 is operated for standby afterburner operation, the total scheduled flow is at such a level that all of the flow is through the core discharge, or conduit 66.

Valve 70, which accepts the discharge from conduit 66, passes flow through conduit 72 or conduits 72 and 74 depending on the level of total scheduled flow from the fuel scheduler 60. Fuel is then introduced into the core of afterburner 12 through fuel nozzles 78 and possibly 76 and ignited by well known means actuated by the closing of the afterburner ignition switch 54. The resultant stable combustion provides a relatively low augmented thrust which maintains afterburner 12 in a standby state of "readiness" to produce full thrust in the minimum possible time when the throttle lever 22 is advanced in a panic movement to full open.

If the afterburner 12 is operating in a state of "readiness," and the flow thereto is through conduit 72, a rapid throttle movement to full open will cause valve 70 to suddenly pass fuel to conduit 74, thus causing a temporary diversion of flow from conduit 72 while conduit 74 and nozzles 76 are filled. This diversion may reduce the flow to the primary core nozzles 78 enough to cause termination of combustion.

To prevent the possibility of this occurrence, means are provided to keep conduit 74 and nozzles 76 filled whenever fuel is flowing to the afterburner 12. The means may take the form of a valve 120 adapted to pass fuel at a relatively low flow rate from conduit 66 to conduit 74 through conduits 118, 122. The valve 120 is set to pass fuel at the same pressure that causes valve 70 to pass fuel to conduit 72. The fuel flow to the core of afterburner 12 at very low flow rates is then through conduit 72 and through conduit 74. The level of flow through valve 120 is the minimum necessary to keep conduit 74 and nozzles 76 filled, so as not to affect the normal passing of fuel to conduit 74 by valve 70.

The secondary flow path, provided from conduit 66 to conduit 74, enables a uniform delivery of fuel to the core of afterburner 12 when throttle lever 22 is rapidly advanced from a low angle to maximum.

As was mentioned before, the afterburner 12 provides a relatively low level of augmented thrust when the fuel control system 60 is scheduling fuel thereto at low engine thrust levels. Nonetheless there is a thrust increase above that demanded by the angle of the throttle lever. In order to maintain at least a substantially constant thrust level when standby operation is initiated, means are provided for automatically increasing the area of nozzle 38, thereby dissipating a portion of the available energy.

Normally, the nozzle area control 91 emits control signals to the nozzle actuators 96 in accordance with a predetermined schedule of nozzle area as a function of throttle angle. Whenever the turbine discharge temperature is above a predetermined reference, temperature control 90 causes the nozzle area control 91 to increase the area of exhaust nozzle 38 above this schedule.

The temperature control 90, as previously indicated, provides an override signal when a predetermined allowable temperature is exceeded. A suitable temperature reference means 114 having an engine speed input produces a reference voltage output shown by the solid line plot of FIGURE 3. It will be noted from the plot in FIGURE 3 that for present purposes only that portion of engine operation above 80 percent speed (approximately) is pertinent. This output is fed by lead 117 to comparing means 119. When the voltage input (properly calibrated) from temperature sensor 102 exceeds the reference voltage, an override signal is generated on lead 100. It will be noted that the reference voltage plot allows for higher turbine discharge temperatures as engine speeds increase to 100 percent.

When the engine 10 is operating at low thrust levels, the actual turbine discharge temperatures are generally lower than the reference temperatures shown in FIGURE 3, so that the area of exhaust nozzle 38 is primarily a function of throttle angle.

In order to increase the area of the exhaust nozzle 38 from this schedule and reduce the velocity of the gases therefrom, while the afterburner 12 is operated in a standby state, the temperature reference means 114 may be modified.

The temperature reference means 114 is conveniently illustrated as an electrical amplifier, the output function of which may be readily modified. For purposes of illustration, it is assumed that such modification can be obtained simply by incorporating additional resistance into the amplifier circuit. Such an expedient is illustrated in FIGURE 1 by resistor 123 which is connected to the amplifier circuitry at points $s$ and $t$. When switch 116 is closed, a current path is completed through leads 124, 126 (as later described) to incorporate the resistor 123 in the temperature reference amplifier 114. The result is that the voltage output indicating permissible temperature follows the shallower dotted line shown in FIGURE 3. The slope of this modified temperature (voltage) line is such that normal turbine discharge temperature will create an error signal input to the nozzle area control 91 which causes the nozzle area to be increased by an amount necessary to maintain a substantially constant thrust level, as compared to normal operation, when standby operation of the afterburner is in effect. It is desirable, if not essential, that the afterburner nozzles be ignited for standby operation before the reference temperature means are so modified. The means for accomplishing this end will be apparent from the following description of the electrical circuitry which is energized by closure of the pilot operated switch 116.

Closure of switch 116 energizes a relay 112, causing contacts 125 to close and complete a circuit through lines 110, 111 for energizing the valve solenoid 108. Fuel is now delivered to the afterburner nozzles 78 and possibly 76 and ignited as previously described.

As a transient condition there is a rate of pressure increase in the afterburner 12 as a result of initial afterburner combustion being established to a point where it will not be adversely affected by increasing the discharge nozzle area. This latter condition can be detected by other parameters also.

This rate of pressure increase is detected by a sensor 130 which, in effect, is a switch that is closed when rate of pressure increase exceeds a given value. Closure of sensor switch 130 completes a current path for energizing relay 128 from the positive line 110, through contacts 127 (of relay 112) and lines 132, 134. Relay contacts 133 are now closed to complete the current flow path through resistor 123 and modify the temperature reference means 114 as previously described.

Since the sensor switch 130 is usually closed only momentarily, relay 128 is provided with hold in contacts 135 and lines 138, 140 so that both of the relays 112, 128 are energized so long as the switch 116 is closed.

The afterburner control system described above has particular utility in flight situations where the thrust of engine 10 is increased from a low level to a maximum at an extreme rate, as in the case of an emergency wave-off of an aircraft carrier landing approach. When afterburner 12 is operated in a standby state, a panic movement of throttle 22 from a relatively low angle to its extreme position causes fuel scheduler 60 to almost instantaneously schedule fuel to the afterburner 12 at its maximum rate (further increased by a rising compressor discharge pressure), thereby providing fully augmented afterburner thrust in the minimum possible time.

The particular control system shown in illustrating the preferred embodiment of the present invention is but one of many systems available for modification to produce low thrust afterburner operation in a standby state of "readiness" at low engine thrust levels. Other modifications will occur to those skilled in the art and the scope of the invention is to be derived solely from the following claims.

Having thus described the invention, what is claimed as novel and desired to be secured by Letters Patent of the United States is:

1. In a turbojet engine which is to be controlled by a throttle lever for aircraft propulsion,
    said engine comprising a main combustor for producing primary thrust and an afterburner for producing augmented thrust,
    means for scheduling flow of fuel to said combustor as a function of lever movement in a given direction to increase the rate of engine operation to a maximum value in providing primary thrust for the aircraft,
    means for scheduling flow of fuel to said afterburner in response to movement of said lever beyond a position scheduling substantially maximum fuel flow to said combustor,
    means for actuating said afterburner scheduling means in response to operation of said engine at approximately a maximum rate,
    the improvement which consists of means for selectively actuating said afterburner scheduling means for delivery of fuel to said afterburner at a relatively low rate when the throttle lever is within given limits substantially below its maximum scheduling position when the rate of said engine operation is below a maximum rate,
    whereby said afterburner may be placed in a standby state to rapidly produce maximum augmented thrust when said throttle is advanced at an extreme rate to approximately its highest position.

2. A control system as in claim 1 wherein the engine comprises a compressor discharging air to said combustor and wherein the afterburner scheduling means include means for delivering fuel as a minimum constant in relation to throttle lever movement between said given limits and means responsive to the compressor discharge pressure for modifying the delivery of fuel by said afterburner fuel scheduling means as a function thereof to maintain a fuel-air mixture sufficient to support combustion, whereby during standby operation the amount of fuel supplied to said afterburner is at a minimum level sufficient to support stable combustion.

3. A control system as in claim 1 in which during standby operation of the afterburner a portion of the thrust of the engine is derived from said main combustor and a portion from said afterburner, and further wherein means are provided for maintaining the total engine thrust substantially constant during actuation of said selective means for scheduling fuel for standby operation.

4. A control system as in claim 3 wherein the relation between throttle lever angle and the combustor fuel scheduling means is unaffected by actuation of said afterburner for standby operation and said turbojet engine has a variable area exhaust nozzle, said system further comprising, means for varying the area of said nozzle to optimize the thrust of said engine, said maintaining means comprise means for increasing the area of said nozzle above the area for said optimum thrust in response to said afterburner providing thrust during standby operation, whereby a portion of the available energy is dissipated to maintain said substantially constant thrust level.

5. A control system as in claim 4 wherein a reference temperature signal is generated as a function of the rate of operation of the engine, a signal is generated reflecting actual engine temperature, means are provided for comparing said signals and generating an override signal when actual temperature exceeds reference temperature, said nozzle area varying means being responsive to such override signal to increase the nozzle area, and said increasing means include means for lowering the temperature reference signal to produce an override signal which causes the nozzle area to increase and maintain a substantially constant thrust level.

6. A control system as in claim 4 wherein means are provided for detecting ignition of said afterburner and producing an actuating signal indicating that the afterburner is providing thrust, said maintaining means being responsive to said actuating signal.

7. A control system as in claim 1, wherein both of said actuation means comprise a valve for preventing flow of fuel to said afterburner scheduling means, said valve being opened in response to a pressure signal of a given level, said first actuating means including means connected to said valve for deriving a pressure signal indicating said rate of operation, said second actuating means include means for deriving from a constantly available source and connected to said valve, and a second valve normally blocking said second pressure signal, and pilot controlled means for selectively opening said second valve to actuate said second actuating means.

8. A control system as in claim 1 wherein said afterburner comprises a plurality of nozzles to which fuel is delivered by said scheduling means, a valve adapted to receive fuel from said scheduling means and having a low pressure discharge to said certain nozzles and a high pressure discharge to other nozzles, said valve being adapted to pass fuel to said low pressure discharge when a first predetermined pressure is exceeded and adapted to pass fuel to said high and low pressure discharge when a second higher predetermined pressure is exceeded, means for delivery of fuel from said scheduling means to said high pressure discharge at a relatively low rate when said first predetermined flow is exceeded, said rate being the minimum necessary to fill the nozzles fed by said high pressure discharged, whereby when the flow into said valve is rapidly increased the passing of fuel to said high pressure discharge has a negligible effect on the flow of fuel to the nozzles of said afterburner.

References Cited

UNITED STATES PATENTS

| | | | |
|---|---|---|---|
| 2,737,016 | 3/1956 | Day | 60—238 |
| 2,737,775 | 3/1956 | Klauber | 60—238 |
| 2,774,215 | 12/1956 | Mock et al. | 60—237 |
| 2,958,186 | 11/1960 | Mock | 60—238 |
| 3,060,683 | 10/1962 | O'Neil | 60—237 |
| 3,243,955 | 4/1966 | Frank | 60—243 |

JULIUS E. WEST, *Primary Examiner.*